United States Patent

Watanabe et al.

[11] Patent Number: 5,939,471
[45] Date of Patent: Aug. 17, 1999

[54] COMPOSITE MATERIAL AND MOLDED ARTICLES CONTAINING SAME

[75] Inventors: Hiroyuki Watanabe, Hiroshima; Hitoshi Ige, Toyama; Akira Yanagase, Hiroshima, all of Japan

[73] Assignee: Mitsubishi Rayon Co., Ltd., Tokyo, Japan

[21] Appl. No.: 08/945,169

[22] PCT Filed: Apr. 25, 1996

[86] PCT No.: PCT/JP96/01127

§ 371 Date: Oct. 23, 1997

§ 102(e) Date: Oct. 23, 1997

[87] PCT Pub. No.: WO96/34036

PCT Pub. Date: Oct. 31, 1996

[30] Foreign Application Priority Data

Apr. 25, 1995 [JP] Japan ................................. 7-124264

[51] Int. Cl.⁶ ................................. C08K 9/02; C08K 3/36
[52] U.S. Cl. ................................. 523/334; 523/205; 523/216; 524/493; 524/789
[58] Field of Search .................... 524/493, 789; 523/205, 200, 216, 334

[56] References Cited

U.S. PATENT DOCUMENTS

| 5,322,889 | 6/1994 | Yamamoto et al. . |
| 5,385,988 | 1/1995 | Yamamoto et al. . |
| 5,391,647 | 2/1995 | Yamamoto et al. . |
| 5,695,851 | 12/1997 | Watanabe et al. . |
| 5,726,235 | 3/1998 | Takagi et al. ........................... 524/493 |

FOREIGN PATENT DOCUMENTS 404300980  10/1992  Japan .

*Primary Examiner*—Tae Yoon
*Attorney, Agent, or Firm*—Oblon, Spivak, McClelland, Maier & Neustadt, P.C.

[57] ABSTRACT

A composite material having a structure in which negatively charged colloidal silica having an average particle diameter of not greater than 50 nm and remaining substantially in the form of primary particles is attached to the outer surfaces of negatively charged polymer particles. By using this composite material, there can be obtained molded articles wherein colloidal silica is dispersed in a resin while remaining substantially in the form of primary particles.

14 Claims, 1 Drawing Sheet

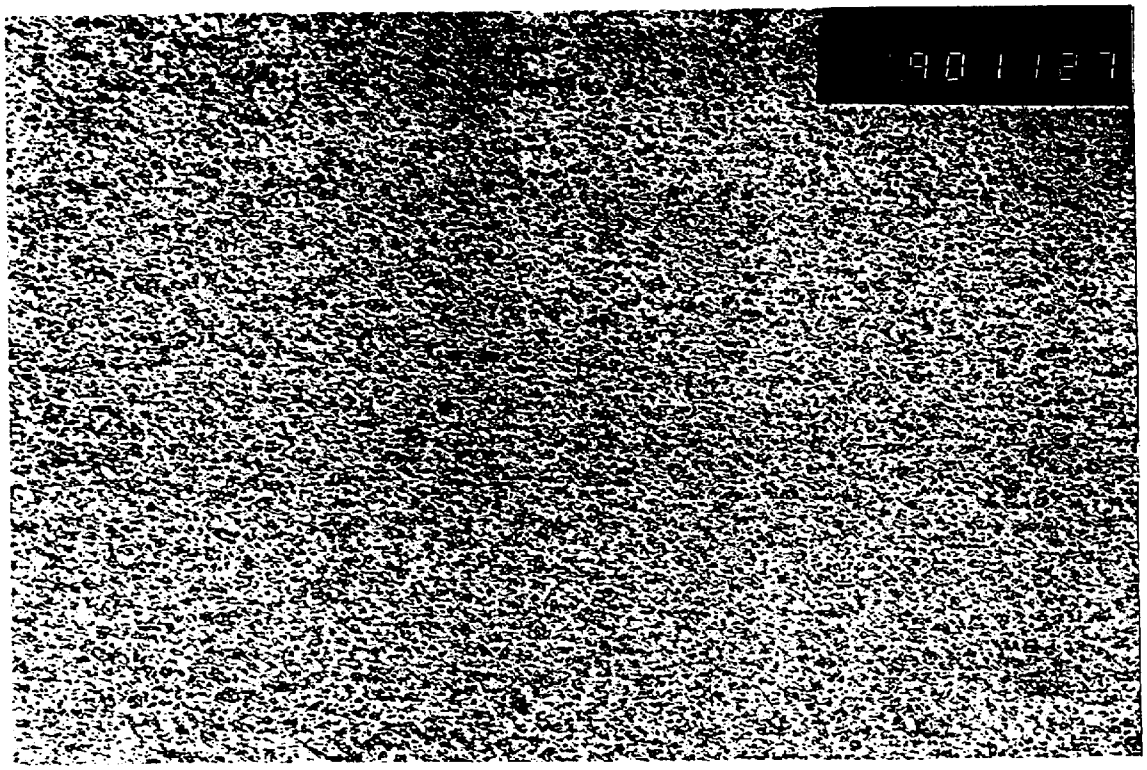
500 nm

COMPOSITE MATERIAL AND MOLDED ARTICLES CONTAINING SAME

TECHNICAL FIELD

This invention relates to composite materials comprising fine silica particles and organic polymers, and to molded articles made by using such composite materials.

BACKGROUND ART

Generally, many organic polymers have low rigidity, low hardness and low thermal resistance. As an attempt to improve these properties, the formation of composite materials by combination with inorganic materials has frequently been investigated until now.

As composite materials containing colloidal silica, for example, coating compositions comprising an aqueous emulsion of an acrylic polymer having alkoxysilyl or hydroxyl groups and colloidal silica are disclosed in Japanese Patent Publication Nos. 41180/'89, 48832/'92 and 40796/'93, Japanese Patent Laid-Open Nos. 287217/'93, 199917/'94 and 26165/'95, and Japanese Patent Publication No. 94620/'95. These coating compositions are effective in modifying the surface properties of plastic moldings, but cannot improve the rigidity, toughness and thermal resistance of the moldings themselves.

Moreover, thermoplastic resins containing a core/shell material having colloidal silica as the core and polyorganosiloxane as the shell, and a vinyl monomer graft-copolymerized thereto are disclosed in Japanese Patent Laid-Open Nos. 223333/'91, 231925/'91, 270710/'92 and 117338/'93. The process disclosed in these patents comprises polymerizing a siloxane in an aqueous dispersion of colloidal silica to prepare a silica core/silicone shell material and then effecting the emulsion polymerization of a vinyl monomer thereon to obtain a vinyl polymer-grafted core/shell material. Consequently, this process has the disadvantage that, unless a high proportion of a silicone component is added, a large amount of undesired solid matter (cullets) may be formed in the polymerization system and that, depending on the type of the vinyl monomer, the components within the polymerization vessel may solidify during polymerization and fail to yield a stable emulsion. That is, this process involves considerable limitations on composition. Moreover, this process allows colloidal silica to assume only a morphology in which it is completely covered with silicone rubber, and fails to achieve an effect anticipated by incorporating colloidal silica in a resin (i.e., an improvement in the rigidity and thermal resistance of molded articles). Actually, it is theoretically and experimentally shown in J. Mat. Sci., Vol. 29, p. 4651 (1994) that high rigidity cannot be achieved in a structure in which an inorganic filler is coated with a rubber component.

Furthermore, Japanese Patent Laid-Open No. 322036/'94 discloses a process for the preparation of a silica-containing acrylic polymer composition which comprises subjecting a (meth)acrylate and a crosslinkable monomer to emulsion polymerization or suspension polymerization and, when a predetermined degree of polymerization is reached, adding fine silica particles that have previously been treated with a silane coupling agent. In this process, however, a crosslinkable monomer is indispensably used in order to disperse silica satisfactorily and to crosslink the polymer thermally by subsequent addition of a crosslinking agent. Moreover, fine particles of silica powder must previously be dispersed in water and treated with a silane coupling agent. Thus, this process inevitably requires a complicated procedure. Furthermore, since the fine particles of silica powder dispersed in the acrylic polymer have a size greater than a submicron order, it is impossible to obtain highly transparent molded articles which are desired in the present invention.

In addition, Japanese Patent Publication No. 50881/'81 and Japanese Patent Laid-Open Nos. 213839/'87, 53727/'95 and 53728/'95 each disclose dispersions and powders of a composite material comprising charged inorganic particles and oppositely charged polymer particles and having a structure in which the polymer particles are coated with the inorganic particles, as well as a process for preparing the same. These patents are directed to soft and sticky polymer particles and are intended to disclose a so-called anti-blocking agent for coating the surfaces of such polymer particles with hard silica and thereby preventing them from sticking together prior to use, thus having applications such as coating materials, adhesives, and toners for copying machines. This process has the disadvantage that, since particles having opposite electric charges are mixed, they tend to agglomerate very rapidly and make it difficult to yield a homogeneous composite material. Moreover, these patents neither disclose nor suggest a melt-formable composite material and a molded article having a substantial thickness and exhibiting high transparency.

Japanese Patent Laid-Open Nos. 175351/'92, 261433/'92 and 88355/'95 each disclose an organic polymer powder carrying thereon an inorganic material derived from an inorganic sol such as colloidal silica and suitable for use as a filler for epoxy resin adhesives. The polymer used therein is likewise a soft and sticky one. Moreover, since emulsion polymerization is always carried out by using a sulfate type emulsifier, it is impossible to coat polymer particles efficiently with colloidal silica remaining in the form of primary particles. In these patents, colloidal silica having a particle diameter of, for example, 10 to 20 nm is mixed with a polymer emulsion in such a proportion as to give a silica content of 10 to 95% by weight, and the resulting mixture is spray-dried to obtain composite particles having a diameter of 0.5 to 10 $\mu$m. Since the product is obtained by spray drying, the composition of the product is the same as that of the charged materials. However, this method does not produce composite particles comprising polymer particles coated with colloidal silica remaining in the form of primary particles, but produces composite particles comprising polymer particles carrying thereon silica agglomerates derived from colloidal silica. Moreover, when large particles of radius a are coated with small particles of radius b, the maximum number of coating particles (R) can be calculated according to the following theoretical equation of F. K. Hansen et al.

$$\text{Maximum number of coating particles}(R) = \frac{2\pi(a+b)^2}{\sqrt{3}\, b^2}$$

Thus, it has been demonstrated that, when colloidal silica having a particle diameter of 10 to 20 nm is used in a content of 10 to 95% by weight, particles having a diameter of 0.5 to 10 $\mu$m cannot be coated with colloidal silica remaining in the form of primary particles.

For example, Example 15 of Japanese Patent Laid-Open No. 175351/'92 discloses a composite material comprising polymer particles having a diameter of 0.5 to 4 $\mu$m which carry thereon 42.9% by weight of silica derived by using colloidal silica having an average particle diameter of 15 nm as a starting material. When the actual number of colloidal silica particles attached to each polymer particle in this composite material was calculated, it was more than 3.5 times greater than the maximum number of coating particles (R) expressed by the above equation. That is, this powder does not carry thereon an inorganic sol having a size of the order of nanometers in the form of primary particles, but carries thereon agglomerates of an inorganic sol.

Japanese Patent Laid-Open No. 209027/'93 discloses a highly transparent composite material which is obtained by treating the surfaces of colloidal silica having dispersibility in organic solvents or water with an alkoxysilane compound, replacing the dispersion medium by a radical-polymerizable vinyl compound, and then polymerizing the resulting mixture. However, this composite material has a mutually penetrating network structure consisting of an organic polymer and a silica network, and is hence incapable of melt forming. Moreover, Japanese Patent Laid-Open No. 287213/'93, Journal of the Japanese Society of Textile Science, Vol. 49, p. 130 (1993), and Polym. Adv. Tech., Vol. 3, p. 91 (1992) each disclose a colloidal solution obtained by modifying colloidal silica dispersed in an organic solvent with a chain polymer compound, as well as a composite powder obtained by separating the solvent by distillation or centrifugation. However, these processes are unsuitable for industrial purposes because they involve high raw material costs and require troublesome process steps.

Furthermore, composite particles obtained by coagulating an organic polymer latex and silica particles are disclosed in "A Collection of Papers on Polymers", Vol. 46, p. 21 (1989), ibid., Vol. 44, p. 483 (1987), and ibid., Vol. 44, p. 839 (1987). However, large silica particles used in these references, which have a diameter of 240 to 1,590 nm, fail to yield highly transparent molded articles desired in the present invention.

DISCLOSURE OF THE INVENTION

It is an object of the present invention to provide a composite material which does not allow colloidal silica particles to agglomerate, which can produce molded articles wherein fine particles of colloidal silica are dispersed in a resin while remaining in the form of primary particles, and which can be obtained at a low cost and in a simple manner.

That is, the present invention provides a composite material having a structure in which negatively charged colloidal silica having an average particle diameter of not greater than 50 nm and remaining substantially in the form of primary particles is attached to the outer surfaces of negatively charged polymer particles.

By melt-forming this composite material, there can be obtained molded articles wherein colloidal silica is dispersed in the molded articles while remaining substantially in the form of primary particles.

BRIEF DESCRIPTION OF THE DRAWINGS

FIG. 1 is a transmission electron micrograph of an ultrathin section of a resin molded article obtained by using the composite material of the present invention.

BEST MODE FOR CARRYING OUT THE INVENTION

The colloidal silica used in the present invention should have an average particle diameter of not greater than 50 nm and the dispersion medium therefor can be water. Various types of such colloidal silica are commercially available. Using colloidal silica having an average particle diameter of greater than 50 nm, it is impossible to simultaneously achieve good transparency, high rigidity and high thermal resistance at which the present invention aims. Colloidal silica having an average particle diameter of not greater than 30 nm is preferably used in the present invention because it can achieve higher transparency.

The colloidal silica used in the present invention should be negatively charged. This can be easily judged by measuring its $\zeta$-potential on the principle of electrophoresis or the like.

In the present invention, there may also be used colloidal silica which has previously been subjected to surface treatment with a silane compound or the like. Such silane compounds include methyltrichlorosilane, dimethyldichlorosilane, trimethylchlorosilane, vinyltrichlorosilane, methyltrimethoxysilane, methyltriethoxysilane, phenyltrimethoxysilane, dimethyldimethoxysilane, trimethylmethoxysilane, vinyltrimethoxysilane, γ-glycidoxypropyltrimethoxysilane, β-(3,4-epoxycyclohexyl)ethyltrimethoxysilane, γ-methacryloyloxypropyltrimethoxysilane, γ-aminopropyltrimethoxysilane, N-β-(aminoethyl)-γ-aminopropyltrimethoxysilane, N-phenyl-γ-aminopropyltrimethoxysilane, γ-chloropropyltrimethoxysilane and the like. The surface treatment may be carried out, for example, by adding a silane compound to an aqueous dispersion of colloidal silica and stirring this mixture at a temperature ranging from room temperature to 100° C. for any desired period of time. The use of colloidal silica having undergone such surface treatment brings about an improvement in the dispersibility of colloidal silica in molded articles formed of the composite material and also contributes to an improvement in the mechanical properties of the molded articles.

The polymer used in the present invention is negatively charged and preferably has an average particle diameter of 20 to 2,000 nm and more preferably 30 to 300 nm.

Useful types of polymers include polymers of radical-polymerizable vinyl compounds; various engineering thermoplastics such as polycarbonates, polyethylene terephthalate, polybutylene terephthalate, polyacetals and polyamides; and thermosetting resins such as epoxy resins, reactive polyester resins, melamine resins, phenolic resins, polyallyl resins and alkyd resins. Among others, polymer particles obtained by subjecting a radical-polymerizable vinyl compound to emulsion polymerization in an aqueous system are preferred.

Various types of radical-polymerizable vinyl compounds can be used in the present invention. Specific examples thereof include methacrylic esters such as methyl methacrylate, ethyl methacrylate, butyl methacrylate and 2-ethylhexyl methacrylate; acrylic esters such as methyl acrylate, ethyl acrylate, butyl acrylate and 2-ethylhexyl acrylate; α,β-unsaturated carboxylic acids such as acrylic acid, methacrylic acid, maleic acid and itaconic acid; unsaturated carboxylic acid anhydrides such as maleic anhydride and itaconic anhydride; maleimide derivatives such as N-phenylmaleimide, N-cyclohexylmaleimide and N-butylmaleimide; hydroxyl-containing vinyl monomers such as 2-hydroxyethyl acrylate, 2-hydroxypropyl acrylate, 2-hydroxyethyl methacrylate and 2-hydroxypropyl methacrylate; nitrogen-containing vinyl monomers such as acrylamide, methacrylamide, acrylonitrile, methacrylonitrile, diacetone acrylamide and dimethylaminoethyl methacrylate; epoxy-containing vinyl monomers such as allyl glycidyl ether, glycidyl acrylate and glycidyl methacrylate; aromatic vinyl compounds such as styrene and α-methylstyrene; olefinic monomers such as ethylene, propylene, butadiene and 4-methyl-1-pentene; halogen-containing vinyl monomers such as vinyl chloride and vinylidene chloride; and crosslinking monomers such as ethylene glycol diacrylate, ethylene glycol dimethacrylate, allyl acrylate, allyl methacrylate, divinylbenzene and trimethylolpropane triacrylate. These radical-polymerizable vinyl compounds may be used alone or in admixture of two or more.

Where high transparency is required of molded articles, it is preferable to use a polymer which is obtained by polymerizing a radical-polymerizable vinyl compound in the presence of an alkoxysilane compound having a mercapto group or an ethylenically unsaturated group and which has at least one type of groups selected from alkoxysilyl and silanol groups.

Examples of the aforesaid alkoxysilane compound include those represented by the following general formulas (I) to (VI).

$$HS(CH_2)_p SiR^1_n (OR^2)_{3-n} \quad (I)$$
$$CH_2=C(R^3)COO(CH_2)_p SiR^1_n (OR^2)_{3-n} \quad (II)$$
$$CH_2=CH(CH_2)_q SiR^1_n (OR^2)_{3-n} \quad (III)$$

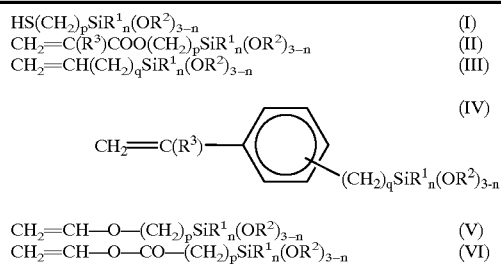
(IV)

$$CH_2=CH-O-(CH_2)_p SiR^1_n (OR^2)_{3-n} \quad (V)$$
$$CH_2=CH-O-CO-(CH_2)_p SiR^1_n (OR^2)_{3-n} \quad (VI)$$

where $R^1$ is a hydrocarbon radical of 1 to 10 carbon atoms, $R^2$ is a hydrogen atom or a hydrocarbon radical of 1 to 10 carbon atoms which may contain an ether linkage, $R^3$ is a hydrogen atom or a methyl group, n is an integer of 0 to 2, p is an integer of 1 to 10, and q is an integer of 0 to 10.

Specific examples of the above-described compounds are as follows. Alkoxysilane compounds of the above general formula (I) include, for example, γ-mercaptopropyltrimethoxysilane and γ-mercaptopropylmethyldimethoxysilane.

Alkoxysilane compounds of the above general formula (II) include, for example, γ-acryloyloxypropyltrimethoxysilane, γ-acryloyloxypropyltriethoxysilane, γ-acryloyloxypropylmethyldimethoxysilane, γ-acryloyloxypropylmethyldiethoxysilane, γ-acryloyloxypropylethyldimethoxysilane, β-acryloyloxyethyltrimethoxysilane, β-acryloyloxyethylmethyldimethoxysilane, γ-methacryloyloxypropyltrimethoxysilane, γ-methacryloyloxypropyltriethoxysilane, γ-methacryloyloxypropylmethyldimethoxysilane, γ-methacryloyloxypropylmethyldiethoxysilane, γ-methacryloyloxypropylethyldimethoxysilane, γ-methacryloyloxypropyldimethylmethoxysilane, β-methacryloyloxyethyltrimethoxysilane and β-methacryloyloxyethylmethyldimethoxysilane.

Alkoxysilane compounds of the general formula (III) include, for example, vinyltrimethoxysilane, vinyltriethoxysilane, vinyltri-n-butoxysilane, vinyltris (β-methoxyethoxy)silane, vinylmethyldimethoxysilane, vinylmethyldiethoxysilane, vinylethyltrimethoxysilane, vinyldimethylmethoxysilane, isopropenyltrimethoxysilane, isopropenylmethyldimethoxysilane, allyltrimethoxysilane, 5-hexenyltrimethoxysilane and 9-decenyltrimethoxysilane.

Silane compounds of the general formula (IV) include, for example, p-vinylphenyltrimethoxysilane (also known as p-trimethoxysilylstyrene), p-vinylphenyltriethoxysilane, p-vinylphenyltriisopropoxysilane, p-vinylphenylmethyldimethoxysilane, p-vinylphenylmethyldiethoxysilane, p-vinylphenylethyldimethoxysilane, p-vinylphenylpropyldimethoxysilane, p-vinylphenylphenyldimetlioxysilane, p-vinylphenyldimethylmethoxysilane, o-vinylphenyltrimethoxysilane, o-vinylphenylmethyldimethoxysilane, m-vinylphenyltrimethoxysilane, o-vinylphenylmethyltrimethoxysilane, p-isopropenylphenyltrimethoxysilane, p-isopropenylphenylmethylmethoxysilane, m-isopropenylphenyl-trimethoxysilane and m-isopropenylphenylmethyldimethoxysilane.

Silane compounds of the general formula (V) include, for example, trimethoxysilylpropyl vinyl ether and methyldimethoxysilylpropyl vinyl ether.

Silane compounds of the general formula (VI) include, for example, vinyl 11-trimethoxysilylundecanoate.

Among these, the compounds of the general formulas (I), (II) and (III) are preferably used from the viewpoint of availability and cost. Especially preferred compounds include γ-mercaptopropyltrimethoxysilane, γ-mercaptopropylmethyldimethoxysilane, γ-methacryloyloxypropyltrimethoxysilane, γ-methacryloyloxypropylmethyldimethoxysilane and vinyltrimethoxysilane.

However, if an alkoxysilane compound having an ethylenically unsaturated group is used in large amounts, crosslinking due to the condensation of silanol groups may occur at many sites between molecules. Consequently the resulting composite material has poor melt formability by heating and produces gel. For this reason, the silane compounds which can most preferably be used in the present invention are alkoxysilane compounds having a mercapto group.

These alkoxysilane compounds of the general formulas (I) to (IV) which have a mercapto group or an ethylenically unsaturated group may be used alone or in admixture of two or more.

When an alkoxysilane compound having a mercapto group is employed, it is preferably used in an amount of not greater than 20 parts by weight, more preferably not greater than 10 parts by weight, per 100 parts by weight of the previously described radical-polymerizable vinyl compound.

When an alkoxysilane compound having an ethylenically unsaturated group is employed, it is preferably used in an amount of not greater than 1 part by weight, more preferably not greater than 0.5 part by weight, per 100 parts by weight of the radical-polymerizable vinyl compound, for the above-described reason.

The use of the alkoxysilane compounds of the general formulas (I) to (IV) which have a mercapto group or an ethlylenically unsaturated group in combination with a radical-polymerizable vinyl compound, has the advantage that a more homogeneous composite material can be formed from colloidal silica and polymer particles derived from the radical-polymerizable vinyl compound.

The method for preparing an aqueous latex of polymer particles by subjecting the radical-polymerizable vinyl compound of the present invention to emulsion polymerization in an aqueous system is described below in connection with several embodiments.

The radical polymerization initiators which can be used for the purpose of emulsion polymerization include, for example, redox initiators comprising a combination of an oxidizing agent consisting of an organic hydroperoxide (e.g., tert-butyl hydroperoxide, cumene hydroperoxide or diisopropylbenzene hydroperoxide) and a reducing agent (e.g., a sugar-containing iron pyrophosphate formulation, a sulfoxylate formulation or a mixed sugar-containing iron pyrophosphate formulation/sulfoxylate formulation); persulfates such as potassium persulfate and ammonium persulfate; azo compounds such as azobisisobutyronitrile, azobisdimethylvaleronitrile and dimethyl 2,2'-azobisisobutyrate; and organic peroxides such as benzoyl peroxide and lauroyl peroxide. Among others, redox initiators are preferred. These radical polymerization initiators are usually used in an amount of 0.01 to 5 parts by weight per 100 parts by weight of the radical-polymerizable vinyl compound.

Various emulsifiers can be used for the purpose of emulsion polymerization. They include, for example, phosphate type emulsifiers such as polyoxyethylene alkyl ether phosphate sodium salt and polyoxyethylene alkylphenyl ether phosphate sodium salt; carboxylate type emulsifiers such as potassium oleate, sodium N-lauroyl sarcosinate, sodium N-myristoyl sarcosinate and potassium alkenylsuccinate; and nonionic emulsifiers such as polyoxyethylene alkyl ester and polyoxyethylene alkylaryl ether. Among others, phosphate type emulsifiers and carboxylate type emulsifiers are preferred and phosphate type emulsifiers are more preferred. Moreover, sulfonate type emulsifiers may be used in combination with the above-described emulsifiers. Such sulfonate type emulsifiers include sodium dodecylbenzenesulfonate, sodium lauryl sulfate, sodium (diphenyl ether)disulfonate, sodium dialkylsulfosuccinate, sodium polyoxyethylene alkylphenyl ether sulfate and the like.

The term "phosphate type emulsifiers" as used herein also include phosphoric acid type emulsifiers typified by polyoxyethylene alkyl ether phosphate, polyoxyethylene alkylaryl ether phosphate and the like. Moreover, polymers containing some phosphate groups and hence having surface activity can also be used as emulsifiers for the purpose of polymerization and, therefore, are included in the term "phosphate type emulsifiers" as used herein. The use of phosphate type emulsifiers has the advantage that colloidal silica can be most efficiently incorporated in the composite material of the present invention by adding the colloidal silica to a latex obtained by the emulsion polymerization of a radical-polymerizable vinyl compound.

These emulsifiers are usually used in an amount of 0.5 to 10 parts by weight per 100 parts by weight of the radical-polymerizable vinyl compound.

For the purpose of emulsion polymerization, a chain-transfer agent may be used as required. Specific examples of the chain-transfer agent include mercaptans such as tert-dodecyl mercaptan, n-octyl mercaptan, n-tetradecyl mercaptan and n-hexyl mercaptan; and halogen compounds such as carbon tetrachloride and ethylene bromide. These chain-transfer agents are usually used in an amount of not greater than 1 part by weight per 100 parts by weight of the radical-polymerizable vinyl compound. Moreover, various electrolytes, pH regulators and the like may also be used as required.

The emulsion polymerization is carried out under conditions including a polymerization temperature of 5 to 100° C., preferably 40 to 95° C., and a polymerization time of about 0.1 to 24 hours. The radical-polymerizable vinyl compound may be added to the reactor at a time, intermittently or continuously, and these techniques may be used in combination.

In the preparation of the composite material of the present invention, it is preferable to use an aqueous latex of negatively charged polymer. If an aqueous latex of a positively charged polymer is mixed with an aqueous dispersion of colloidal silica as will be described later, the polymer particles (positively charged) and the colloidal silica (negatively charged) have electric charges of opposite signs. Consequently, electrical attraction causes the particles to agglomerate very rapidly and inhomogeneously. This is undesirable from an operational point of view because contents within the polymerization vessel become unstable and produce solids or agglomerates (cullets). Moreover, since a composite material having a structure in which colloidal silica is uniformly attached to the outer surfaces of polymer particles derived from a radical-polymerizable vinyl compound so as to remain in the form of primary particles is not formed, it does not show good performance properties (i.e., good appearance, transparency and mechanical properties) which can be achieved by colloidal silica dispersed in the form of primary particles and are aimed in the present invention.

The compounding ratio of colloidal silica and the polymer may be chosen according to the required performance properties. When expressed on a solid silica basis, colloidal silica is preferably used in an amount of 1 to 500 parts by weight, more preferably 1 to 150 parts by weight, per 100 parts by weight of the polymer. Especially where the composite material of the present invention is to be melt-formed alone, it is preferable to use colloidal silica in an amount of 1 to 150 parts by weight per 100 parts by weight of the polymer. In particular, where the composite material of the present invention is to be pelletized alone by means of a kneading machine such as an extruder and then melt-formed according to a well-known technique such as injection molding, the composite material must have sufficient melt flowability to permit its pelletization by extrusion and its injection molding. In such a case, it is preferable to use colloidal silica in an amount of 1 to 100 parts by weight per 100 parts by weight of the polymer. However, this limitation does not apply to the case where well-known polymers are blended with the composite material of the present invention to prepare thermoplastic resin compositions.

The most important consideration in determining the compounding ratio of colloidal silica and the polymer is to choose a range thereof which enables colloidal silica particles to become attached to the outer surfaces of polymer particles while remaining in the form of primary particles. That is, when large particles (polymer particles) of radius a are coated with small particles (colloidal silica) of radius b, it is necessary to calculate the maximum number of coating particles according to the equation of F. K. Hansen et al. and choose the amount of colloidal silica corresponding to it as the upper limit thereof.

More specifically, the average number (N) of colloidal silica particles attached to each polymer particle must be in the range expressed by the following formula:

$$0 < N \leq \frac{2(\pi(a+b))^2}{\sqrt{3}\, b^2}$$

If colloidal silica is used in an amount beyond this range, the colloidal silica can no longer adhere to the outer surfaces of polymer particles while remaining in the form of primary particles, but agglomerates of silica particles will adhere to the outer surfaces of polymer particles. Once silica particles agglomerate, it becomes impossible to disperse them again in the form of primary particles. Accordingly, such an excessive amount of colloidal silica is unsuitable for use in the present invention in which it is desired to obtain highly transparent molded articles by dispersing colloidal silica therein so as to allow it to remain in the form of primary particles.

For example, when polymer particles having a diameter of 50 nm and colloidal silica having a particle diameter of 15 nm are used, the maximum number of coating particles is 68. The amounts of polymer and colloidal silica used to reach the maximum number of coating particles are 23% by weight and 77% by weight, respectively. This means that, if the amount of colloidal silica used is greater than this value, colloidal silica particles will adhere to the outer surfaces of polymer particles while undergoing at least partial agglomeration. Similarly, when polymer particles having a diameter of 100 nm and colloidal silica having a particle diameter of 15 nm are used, the maximum number of coating particles is 213. The amounts of polymer and colloidal silica used to reach the maximum number of coating particles are 44% by weight and 56% by weight, respectively. This means that, if the amount of colloidal silica used is greater than this value, colloidal silica particles will adhere to the outer surfaces of polymer particles while undergoing at least partial agglomeration.

Especially where the composite material obtained in the present invention is to be pelletized alone by means of a kneading machine such as an extruder and then melt-formed according to a well-known technique such as injection molding, or where the composite material is to be dissolved in a solvent, a monomer or the like, it is most preferable with consideration for melt-forming properties (e.g., the flowability of the molten resin) or solubility in the solvent or monomer to determine the amount of colloidal silica used so that the average number (N) of colloidal silica particles attached to each polymer particle is within the range expressed by the following formula:

$$0 < N < \frac{2\pi(a+b)^2}{\sqrt{3}\, b^2} \times 0.5$$

where a is the average particle radius of the polymer and b is the average particle radius of colloidal silica.

If colloidal silica is used in an amount outside this range, the resulting composite material of the present invention may show a reduction in melt flowability or solubility, making it difficult to pelletize the composite material alone by means of a kneading machine such as an extruder or to mold them by injection-molding. However, this limitation does not apply to the case where other well-known polymers are blended with the composite material of the present invention to prepare thermoplastic resin compositions.

The composite material of the present invention may be prepared by adding an aqueous dispersion of colloidal silica to the aqueous latex obtained in the above-described manner, and then stirring this mixture at a temperature ranging from room temperature to 100° C. for any suitable period of time. This stirring yields an aqueous latex of a composite material. The composite material of the present invention can be obtained by separating water from this aqueous latex.

The methods which can be employed to separate water from this aqueous latex include coagulation (e.g., salt coagulation and acid coagulation), spray drying and the like.

According to a specific example of the coagulation method, the composite material is coagulated by adding the resulting aqueous latex thereof to an aqueous solution of a salt (e.g., calcium chloride, magnesium chloride, magnesium sulfate, aluminum sulfate or calcium acetate) or an acid (e.g., sulfuric acid), and heating this mixture as required. The powdery product thus obtained is purified by washing it with water and then drying it.

Alternatively, a solvent which is soluble in water and does not dissolve polymers of radical-polymerizable vinyl compounds, such as methanol, ethanol or isopropyl alcohol, may be used in place of an aqueous solution of a salt or an acid. Thus, the composite material may be coagulated by adding the resulting aqueous latex thereof to such a solvent and heating this mixture.

According to the spray drying method, the aqueous latex containing the composite material is sprayed in a heated atmosphere to obtain a powdery composite material.

The composite material isolated from water in the above-described manner has a structure in which colloidal silica having an average particle diameter of not greater than 50 nm is attached to the outer surfaces of polymer particles derived from a radical-polymerizable vinyl compound. This can be confirmed by observation with a transmission electron microscope.

The composite material of the present invention preferably has an average particle diameter of 30 to 2,100 nm and more preferably 40 to 400 nm. As used herein, the average particle diameter of a composite material is a value obtained by the dynamic light scattering method in which the average particle diameter is measured by applying laser light to an aqueous dispersion of the composite material.

When the composite material of the present invention is used to produce resin molded articles, the colloidal silica existing on the outer surfaces of the composite material is dispersed in the molded articles while remaining in the form of primary particles without undergoing agglomeration. Moreover, since the colloidal silica has a small particle diameter, the molded articles are excellent in transparency. Observation with a transmission electron microscope reveals that the fine particles of colloidal silica contained in these molded articles are very uniformly dispersed in the form of primary particles without undergoing agglomeration. This is believed to impart good transparency to the molded articles.

Where a thermoplastic resin is used for the polymer, the composite material of the present invention is a thermoplastic composite material capable of melt forming. That is, the composite material of the present invention may be pelletized by means of a kneading machine such as an extruder, and may be formed into any desired shape according to a well-known technique such as injection molding or compression molding (press molding). In this case, the composite material of the present invention may be pelletized alone. Alternatively, according to the performance requirements, the composite material of the present invention may be used as a thermoplastic resin composition by blending it with any other well-known polymer that is usually used in an amount of not greater than 99% by weight and preferably not greater than 90% by weight. Where a thermosetting resin is used for the polymer, the composite material of the present invention may be used as a thermoplastic resin composition by blending it with a thermoplastic polymer.

The polymers which may be blended include various thermoplastic polymers such as polyethylene, polypropylene, poly(4-methyl-1-pentene), polymethyl methacrylate, polymethyl methacrylate copolymers (acrylic resins), methyl methacrylate-styrene copolymer, polystyrene, styrene-acrylonitrile copolymer, styrene-maleic anhydride copolymer, styrene-maleimide copolymer, rubber-modified styrene-maleimide copolymer, rubber-reinforced polystyrene (HIPS), acrylonitrile-butadiene-styrene resin (ABS resin), acrylonitrile-ethylenepropylene-styrene resin (AES resin), methyl methacrylate-butadiene-styrene resin (MBS resin), acrylonitrile-butadiene-methyl methacrylate-styrene resin, acrylonitrile-n-butyl acrylate-styrene resin (AAS resin), polyvinyl chloride, polyvinylidene chloride, polycarbonates, polyethylene terephthalate, polyacetals, polyamides, epoxy resins, polyvinylidene fluoride, polysulfones, ethylene-vinyl acetate copolymer, PPS resin, polyetheretherketone, PPO resin, rubber-modified PPO resin, polyamide elastomers, polyester elastomers, polybutadiene, butadiene-styrene copolymer, acrylonitrile-butadiene copolymer, polyisoprene, natural rubber, acrylic rubber, ethylene-propylene copolymer, ethylene-propylene-diene copolymer, chlorinated butyl rubber, chlorinated polyethylene, styrene-butadiene block copolymer, styrene-butadiene-styrene block copolymer, and hydrogenated products of these block copolymers.

The thermoplastic resins (or resin compositions) obtained in pellet form by using the composite material of the present invention may be processed, molded or spun by ordinary means such as compression molding (press molding), injection molding and melt spinning.

Moreover, the composite material of the present invention may be dissolved or dispersed in various solvents, or in solvents in which, besides the above-described thermoplastic resins, polyacrylonitrile polymers and cellulosic polymers are dissolved, or in vinyl monomers. Accordingly, the composite material of the present invention may be dissolved or dispersed in a solvent or a solvent having a polymer dissolved therein, and then subjected to wet or dry molding (or spinning). Alternatively, after the composite material of the present invention is dissolved or dispersed in a vinyl monomer, this mixture is polymerized by bulk polymerization, suspension polymerization or solution polymerization, and then subjected to wet or dry molding (or spinning). Thus, the composite material of the present invention may be formed into plates, rods, granules, films, fibrous products and the like.

Furthermore, in any convenient step, the composite material of the present invention may be mixed with additives such as colorants, ultraviolet absorbers, heat stabilizers, light stabilizers and mold releasing agents, to such an extent as not to detract from the effects of the present invention.

The present invention is more specifically explained with reference to the following examples. In these examples, all "parts" are "parts by weight" unless otherwise stated. The procedures for the evaluation of various properties were as follows.

1) As to transparency, the total light transmittance and haze of a sample having a thickness of ⅛ inch were measured according to ASTM D1003 by using a hazemeter (HGM-2DP; manufactured by Suga Test Instruments Co., Ltd.).

2) As to thermal resistance, Vicat softening temperature was measured according to ASTM D1525.

3) As to strength, flexural strength and flexural modulus of elasticity were measured by performing a bending test according to ASTM D790.

4) The content of inorganic matter in a composite material was calculated from the residue obtained by igniting a given amount of sample in a crucible. 5) The average particle diameter and ζ-potential of a polymer and the ζ-potential of colloidal silica were measured with a dynamic light scattering/laser Doppler type electrophoresis apparatus (ELS-800; manufactured by Otsuka Electronics Co., Ltd.).

EXAMPLE 1

A separable flask fitted with a condenser, a nitrogen inlet and a stirrer was charged with 300 parts of deionized water, 2 parts of polyoxyethylene alkylphenyl ether phosphate sodium salt [GAFAC LO-529 (trade name); manufactured by Toho Chemical Industry Co., Ltd.] as an emulsifier, 0.0003 part of ethylenediaminetetraacetic acid sodium salt (hereinafter abbreviated as EDTA), 0.2 part of sodium formaldehyde sulfoxylate (hereinafter abbreviated as SFS), and 0.0001 part of ferrous sulfate, and its contents were heated to 80° C. with stirring. Then, a mixture composed of 99 parts of methyl methacrylate (hereinafter abbreviated as MMA), 1 part of methyl acrylate (hereinafter abbreviated as MA), 0.25 part of n-octyl mercaptan, and 0.125 part of tert-butyl hydroperoxide (hereinafter abbreviated as TBH) was added dropwise thereto over a period of 1 hour. After completion of the addition, this mixture was held at 80° C. for 2 hours to obtain an aqueous latex of MMA-MA copolymer particles. Measurements according to the dynamic light scattering method (DLS) revealed that these polymer particles had a diameter of 62 nm and a ζ-potential of −36 mV, indicating that they were negatively charged.

Subsequently, 125 parts (25 parts as silica) of an aqueous dispersion of colloidal silica [with a silica content of 20% by weight; Snowtex O (trade name); manufactured by Nissan Chemical Industries Ltd.; hereinafter abbreviated as S-1] having an average particle diameter of 15 nm and a ζ-potential of −17 mV was added thereto with stirring, and this mixture was held at 80° C. for 1 hour. The composite material thus obtained had an average particle diameter of 98 nm. When large particles having a diameter of 62 nm are coated with small particles having a diameter of 15 nm, the theoretical maximum number (R) of small particles attached to each large particle is calculated to be 95 according to the equation of F. K. Hansen et al. However, the average number (N) of colloidal silica particles attached to each polymer particle in this example was 10.

After the reaction system was cooled, the contents were poured into 500 parts of warm water having 5 parts of calcium acetate dissolved therein, and a powdery composite material was separated by salt coagulation. Thereafter, this powdery composite material was thoroughly washed with water and dried at 90° C. for 24 hours. The recovery of this powdery composite material was 94% and the content of inorganic matter in the composite material was 20% by weight, indicating that the added colloidal silica was quantitatively incorporated in the composite material.

This powdery composite material was press-molded at a mold temperature of 220° C. The molded article so formed had a total light transmittance of 90.2%, a haze of 2.8%, a Vicat softening temperature of 122° C., a flexural strength of 800 kg/cm$^2$, and a flexural modulus of elasticity of 42,000 kg/cm$^2$, indicating that it was excellent in transparency, thermal resistance and rigidity.

EXAMPLE 2

A composite material was prepared in the same manner as in Example 1, except that there was employed a polymer obtained by emulsion polymerization using 2 parts of potassium alkenylsuccinate [Latemul ASK (trade name); manufactured by Kao Corporation] as an emulsifier (which polymer had an average particle diameter of 40 nm and a ζ-potential of −35 mV). The recovery of this composite material was 94% and the content of inorganic matter in the composite material was 16% by weight, indicating that most of the added colloidal silica was incorporated in the composite material. The value for R was 48 and the value for N was 2.

This powdery composite material was press-molded at a mold temperature of 220° C. The molded article so formed had a total light transmittance of 89.0%, a haze of 3.4%, a Vicat softening temperature of 120° C., a flexural strength of 800 kg/cm$^2$, and a flexural modulus of elasticity of 40,000 kg/cm$^2$, indicating that it was excellent in transparency, thermal resistance and rigidity.

COMPARATIVE EXAMPLE 1

A composite material was prepared in the same manner as in Example 1, except that there was employed a polymer obtained by emulsion polymerization using 2 parts of sodium dodecylbenzenesulfonate as an emulsifier (which polymer had an average particle diameter of 52 nm and a ζ-potential of −36 mV). The recovery of this composite material was 78% and the content of inorganic matter in the composite material was 1.4% by weight, indicating that the added colloidal silica was scarcely incorporated in the composite material.

EXAMPLE 3

A separable flask similar to that used in Example 1 was charged with 200 parts of deionized water, 1.25 parts of polyoxyethylene alkylphenyl ether phosphate sodium salt [GAFAC LO-529 (trade name); manufactured by Toho Chemical Industry Co., Ltd.] as an emulsifier, 0.0003 part of EDTA, 0.2 part of SFS, and 0.0001 part of ferrous sulfate, and its contents were heated to 75° C. with stirring. Then, a mixture composed of 90 parts of MMA, 10 parts of MA, 1 part of γ-mercaptopropyltrimethoxysilane, and 0.125 part of TBH was added dropwise thereto over a period of 3 hours. After completion of the addition, this mixture was held at 75° C. for 2 hours to obtain an aqueous latex of a polymer. Measurements according to DLS revealed that these polymer particles had an average diameter of 84 nm and a ζ-potential of −29 mV, indicating that they were negatively charged.

Subsequently, 125 parts (25 parts as silica) of the aqueous dispersion of colloidal silica S-1 was added thereto with stirring, and this mixture was held at 80° C. for 1 hour. The composite material thus obtained had an average particle diameter of 107 nm. The value for R was 158 and the value for N was 24.

When the aqueous latex containing this composite material was observed with a transmission electron microscope, it was found that colloidal silica having a particle diameter of 15 nm was attached to the outer surfaces of MMA-MA copolymer particles while remaining in the form of primary particles without undergoing agglomeration.

After the reaction system was cooled, the contents were poured into warm water having 5 parts of calcium acetate dissolved therein, and a powdery composite material composed of an MMA-MA copolymer and colloidal silica was separated by salt coagulation. Thereafter, this powdery composite material was thoroughly washed with water and dried at 90° C. for 24 hours. The recovery of this powdery composite material was 97% and the content of inorganic matter in the composite material was 21% by weight, indicating that the added colloidal silica was quantitatively incorporated in the composite material.

Using a twin-screw extruder, this powdery composite material was pelletized by extrusion at a cylinder temperature of 220° C. Then, these pellets were injection-molded to form a molded article. This molded article had a total light transmittance of 92.0%, a haze of 1.5%, a Vicat softening temperature of 104° C., a flexural strength of 1,000 kg/cm$^2$, and a flexural modulus of elasticity of 43,300 kg/cm$^2$, indicating that it was excellent in transparency, thermal resistance and rigidity.

A sample was made by press-molding the aforesaid pellets at a molding temperature of 220° C. A transmission electron micrograph of this sample revealed that the colloidal silica particles having a primary particle diameter of 15 nm were uniformly dispersed without undergoing any agglomeration (FIG. 1).

Comparative Example 2

A composite material was prepared in the same manner as in Example 3, except that an aqueous dispersion of silica particles having an average particle diameter of 250 nm was used in place of the aqueous dispersion of colloidal silica S-1. The recovery of this composite material was 95% and the content of inorganic matter in the composite material was 21% by weight, indicating that the added silica particles were quantitatively incorporated in the composite material.

This powdery composite material was press-molded at a mold temperature of 220° C. The molded article so formed was white-colored and had a total light transmittance of 34.1% and a haze of 92.1%, indicating that it was poor in transparency.

COMPARATIVE EXAMPLE 3

A composite material was prepared in the same manner as in Example 3, except that an aqueous dispersion containing 10% by weight of finely powdered pyrolytic silica having a primary particle diameter of 12 nm [Aerosil 200 (trade name); manufactured by Nippon Aerosil Co., Ltd.] was used in place of the aqueous dispersion of colloidal silica S-1, and mixed with the aqueous latex of the polymer in such a proportion as to give a silica content of 20% by weight in the solid component of the mixture. The silica dispersion showed a milky turbidity and the silica particles were not dispersed in the form of primary particles.

The recovery of this composite material was 95% and the content of inorganic matter in the composite material was 20% by weight, indicating that the added fine silica powder was quantitatively incorporated in the composite material.

This powdery composite material was press-molded at a mold temperature of 220° C. The molded article so formed was white-colored and had a total light transmittance of 68.0% and a haze of 42.2%, indicating that it was poor in transparency.

COMPARATIVE EXAMPLE 4

An aqueous latex of a polymer was prepared in the same manner as in Example 3, except that 2 parts (on a solid basis) of lauryltrimethylammonium chloride [Coatamine 24P (trade name); manufactured by Kao Corporation] was used as an emulsifier. Measurements according to DLS revealed that these latex particles had an average diameter of 81 nm and a ζ-potential of +24 mV, indicating that they were positively charged.

Subsequently, 125 parts (25 parts as silica) of the aqueous dispersion of colloidal silica S-1 was added thereto with stirring. This induced rapid agglomeration, resulting in a solidification of the contents.

EXAMPLE 4

A powdery composite material was prepared in the same manner as in Example 3, except that the aqueous dispersion of colloidal silica S-1 was used in an amount of 214 parts (43 parts as silica). The recovery of this composite material was 98% and the content of inorganic matter in the composite material was 31% by weight, indicating that the added colloidal silica was quantitatively incorporated in the composite material. The composite material thus obtained had an average particle diameter of 110 nm and the value for N was 41.

Using a twin-screw extruder, this powdery composite material was pelletized by extrusion at a cylinder temperature of 220° C. Then, these pellets were injection-molded to form a molded article. This molded article had a total light transmittance of 91.5%, a haze of 2.4%, a Vicat softening temperature of 115° C., a flexural strength of 900 kg/cm$^2$, and a flexural modulus of elasticity of 51,000 kg/cm$^2$, indicating that it was excellent in transparency, thermal resistance and rigidity.

Moreover, 66 parts of this powdery composite material was blended with 34 parts of beads of a copolymer composed of 90% of MMA component and 10% of MA component. Using a twin-screw extruder, this blend was pelletized by extrusion at a cylinder temperature of 220° C. Then, these pellets were injection-molded to form a molded article. This molded article had a total light transmittance of 91.6%, a haze of 2.6%, a Vicat softening temperature of 106° C., a flexural strength of 1,100 kg/cm$^2$, and a flexural modulus of elasticity of 44,000 kg/cm$^2$, indicating that it was excellent in transparency, thermal resistance and rigidity.

EXAMPLE 5

A composite material was prepared in the same manner as in Example 3, except that the aqueous dispersion of colloidal silica S-1 was used in an amount of 333 parts (66 parts as silica). The recovery of this composite material was 96% and the content of inorganic matter in the composite material was 40% by weight, indicating that the added colloidal silica was quantitatively incorporated in the composite material. The composite material thus obtained had an average particle diameter of 112 nm and the value for N was 64.

This powdery composite material was press-molded at a mold temperature of 220° C. The molded article so formed had a total light transmittance of 91.2%, a haze of 2.8%, a Vicat softening temperature of 152° C., a flexural strength of 900 kg/cm$^2$, and a flexural modulus of elasticity of 61,900 kg/cm$^2$, indicating that it was excellent in transparency, thermal resistance and rigidity.

EXAMPLE 6

A composite material was prepared in the same manner as in Example 3, except that the aqueous dispersion of colloidal silica S-1 was used in an amount of 750 parts (150 parts as silica). The recovery of this composite material was 87% and the content of inorganic matter in the composite material was 60% by weight, indicating that the added colloidal silica was quantitatively incorporated in the composite material. The composite material thus obtained had an average particle diameter of 110 nm and the value for N was 143.

It was tried to press-mold this powdery composite material at a mold temperature of 250° C., but the composite material had poor meltability. Accordingly, the composite material was molded by heating and application of pressure. The molded article so formed had a total light transmittance of 82.0%, a haze of 8.5%, a Vicat softening temperature of 185° C., a flexural strength of 600 kg/cm$^2$, and a flexural modulus of elasticity of 99,000 kg/cm$^2$.

COMPARATIVE EXAMPLE 5

A composite material was prepared in the same manner as in Example 3, except that the aqueous dispersion of colloidal silica S-1 was used in an amount of 2,000 parts (400 parts as silica). The recovery of this composite material was 82% and the content of inorganic matter in the composite material was 77% by weight, indicating that the added colloidal silica was almost quantitatively incorporated in the composite material.

It was tried to press-mold this powdery composite material at a mold temperature of 260° C., but the powder was only pressed together without being melted. Thus, no molded article having good transparency was obtained. The value for N was 320 and exceeded the theoretical maximum number of coating particles (R=158).

EXAMPLE 7

A composite material was prepared in the same manner as in Example 3, except that the surfaces of the colloidal silica had previously been partially trimethylsilylated by adding 0.2 part of trimethylmethoxysilane to 125 parts (25 parts as silica) of the aqueous dispersion of colloidal silica S-1 (so as to give a ζ-potential of −12 mV).

The recovery of this powdery composite material was 95% and the content of inorganic matter in the composite material was 21% by weight, indicating that the added colloidal silica was quantitatively incorporated in the composite material. The composite material thus obtained had an average particle diameter of 105 nm.

Using a twin-screw extruder, this powdery composite material was pelletized by extrusion at a cylinder temperature of 220° C. Then, these pellets were injection-molded to form a molded article. This molded article had a total light transmittance of 92.3%, a haze of 1.3%, a Vicat softening temperature of 104° C., a flexural strength of 1,000 kg/cm$^2$, and a flexural modulus of elasticity of 43,000 kg/cm$^2$, indicating that it was excellent in transparency, thermal resistance and rigidity.

EXAMPLE 8

A composite material was prepared in the same manner as in Example 3, except that 125 parts (25 parts as silica) of an aqueous dispersion of colloidal silica [with a silica content of 20% by weight; Snowtex OL (trade name); manufactured by Nissan Chemical Industries Ltd.] having an average particle diameter of 45 nm and a ζ-potential of −40 mV was used. The recovery of this composite material was 97% and the content of inorganic matter in the composite material was 21% by weight, indicating that the added colloidal silica was quantitatively incorporated in the composite material. The composite material thus obtained had an average particle diameter of 120 nm, the value for R was 30, and the value for N was 1.

Using a twin-screw extruder, this composite material was pelletized by extrusion at a cylinder temperature of 220° C. Then, these pellets were injection-molded to form a molded article. This molded article had a total light transmittance of 84.5%, a haze of 4.9%, a Vicat softening temperature of 104° C., a flexural strength of 1,000 kg/cm$^2$, and a flexural modulus of elasticity of 42,200 kg/cm$^2$.

EXAMPLE 9

A composite material was prepared in the same manner as in Example 3, except that there was employed a polymer obtained by emulsion polymerization using 2 parts of sodium N-lauroyl sarcosinate [Sarcosinate LN (trade name); manufactured by Nikko Chemicals Co., Ltd.] as an emulsifier (which polymer had an average particle diameter of 50 nm and a ζ-potential of -20 mV). The recovery of this composite material was 94% and the content of inorganic matter in the composite material was 21% by weight, indicating that the added colloidal silica was quantitatively incorporated in the composite material. The composite material thus obtained had an average particle diameter of 75 nm, the value for R was 68, and the value for N was 5.

This powdery composite material was press-molded at a mold temperature of 220° C. The molded article so formed had a total light transmittance of 91.2%, a haze of 1.9%, a Vicat softening temperature of 104° C., a flexural strength of 1,000 kg/cm$^2$, and a flexural modulus of elasticity of 42,500 kg/cm$^2$.

EXAMPLE 10

A separable flask similar to that used in Example 1 was charged with 300 parts of deionized water, 2 parts of polyoxyethylene alkylphenyl ether phosphate sodium salt [GAFAC LO-529 (trade name); manufactured by Toho Chemical Industry Co., Ltd.] as an emulsifier, 0.0003 part of EDTA, 0.2 part of SFS, and 0.0001 part of ferrous sulfate, and its contents were heated to 80° C. with stirring. Then, a mixture composed of 99 parts of MMA, 1 part of MA, 0.2 part of γ-methacryloyloxypropyltrimethoxysilane, 0.25 part of n-octyl mercaptan, and 0.125 part of TBH was added dropwise thereto over a period of 3 hours. After completion of the addition, this mixture was held at 80° C. for 2 hours to obtain an aqueous latex of a polymer. Measurements according to DLS revealed that these latex particles had an average diameter of 80 nm and a ζ-potential of -30 mV, indicating that they were negatively charged.

Subsequently, 125 parts (25 parts as silica) of the aqueous dispersion of colloidal silica S-1 was added thereto with stirring, and this mixture was held at 30° C. for 1 hour. The composite material thus obtained had an average particle diameter of 95 nm, the value for R was 145, and the value for N was 21.

After the reaction system was cooled, the contents were poured into 500 parts of warm water having 5 parts of calcium acetate dissolved therein, and a powdery composite material composed of an MMA-MA copolymer and colloidal silica was separated by salt coagulation. Thereafter, this powdery composite material was thoroughly washed with water and dried at 90° C. for 24 hours. The recovery of this powdery composite material was 97% and the content of inorganic matter in the composite material was 20% by weight, indicating that the added colloidal silica was quantitatively incorporated in the composite material.

Using a twin-screw extruder, this composite material was pelletized by extrusion at a cylinder temperature of 220° C. Then, these pellets were injection-molded to form a molded article. This molded article had a total light transmittance of 91.4%, a haze of 2.5%, a Vicat softening temperature of 122° C., a flexural strength of 1,000 kg/cm$^2$, and a flexural modulus of elasticity of 42,800 kg/cm$^2$, indicating that it was excellent in transparency, thermal resistance and rigidity.

EXAMPLE 11

A composite material was prepared in the same manner as in Example 10, except that there was employed a polymer obtained by using 0.2 part of vinyltrimethoxysilane as an alkoxysilane compound (A) (which polymer had an average particle diameter of 80 nm and a ζ-potential of -29 mV). The recovery of this powdery composite material was 96% and the content of inorganic matter in the composite material was 20% by weight, indicating that the added colloidal silica was quantitatively incorporated in the composite material. The composite material thus obtained had an average particle diameter of 91 nm.

Using a twin-screw extruder, this composite material was pelletized by extrusion at a cylinder temperature of 220° C. Then, these pellets were injection-molded to form a molded article. This molded article had a total light transmittance of 91.0%, a haze of 2.5%, a Vicat softening temperature of 120° C., a flexural strength of 1,000 kg/cm$^2$, and a flexural modulus of elasticity of 42,000 kg/cm$^2$, indicating that it was excellent in transparency, thermal resistance and rigidity.

EXAMPLE 12

A separable flask similar to that used in Example 1 was charged with 300 parts of deionized water, 1.25 parts of polyoxyethylene alkylphenyl ether phosphate sodium salt [GAFAC LO-529 (trade name); manufactured by Toho Chemical Industry Co., Ltd.] as an emulsifier, 0.0012 part of EDTA, 0.8 part of SFS, and 0.0004 part of ferrous sulfate, and its contents were heated to 70° C. with stirring. Then, a mixture composed of 29 parts of acrylonitrile, 71 parts of styrene, 1 part of γ-mercaptopropyltrimethoxysilane, and 0.5 part of cumene hydroperoxide was added dropwise thereto over a period of 3 hours. After completion of the addition, this mixture was held at 70° C. for 2 hours to obtain an aqueous latex of a polymer.

Measurements according to DLS revealed that these latex particles had an average diameter of 135 nm and a ζ-potential of -35 mV, indicating that they were negatively charged.

Subsequently, 125 parts (25 parts as silica) of the aqueous dispersion of colloidal silica S-1 was added thereto with stirring, and this mixture was held at 70° C. for 0.5 hour. The composite material thus obtained had an average particle diameter of 162 nm, the value for R was 362, and the value for N was 99.

After the reaction system was cooled, the contents were poured into 500 parts of warm water having 5 parts of calcium acetate dissolved therein, and a powdery composite material composed of an acrylonitrile-styrene copolymer and colloidal silica was separated by salt coagulation. Thereafter, this powdery composite material was thoroughly washed with water and dried at 90° C. for 24 hours. The recovery of this powdery composite material was 97% and the content of inorganic matter in the composite material was 21% by weight, indicating that the added colloidal silica was quantitatively incorporated in the composite material.

Using a twin-screw extruder, this composite material was pelletized by extrusion at a cylinder temperature of 220° C. Then, these pellets were injection-molded to form a molded article. This molded article had a total light transmittance of 85.0%, a haze of 3.8%, a Vicat softening temperature of 115° C., a flexural strength of 900 kg/cm$^2$, and a flexural modulus of elasticity of 47,700 kg/cm$^2$, indicating that it was excellent in transparency, thermal resistance and rigidity.

According to the present invention, resin molded articles in which fine particles of colloidal silica having a size of the order of nanometers are dispersed in a resin while remaining in the form of primary particles and which are excellent in rigidity, toughness, thermal resistance, transparency and processability can be obtained at a low cost and in a simple process. Moreover, molded articles containing the composite material of the present invention are useful in various applications in which inorganic glass has hitherto been used, such as windowpanes for buildings and vehicles.

We claim:

1. A composite material having a structure in which negatively charged colloidal silica having an average particle diameter of not greater than 50 nm and remaining substantially in the form of primary particles is attached to the outer surfaces of negatively charged polymer particles having an average particle diameter of 20 to 2000 nm, wherein the average number (N) of colloidal silica particles attached to each polymer particle is in the range expressed by the following formula:

$$0 < N < \frac{2\pi(a+b)^2}{\sqrt{3}\,b^2} \times 0.5$$

where a is the average particle radius of the polymer and b is the average particle radius of the colloidal silica and a is larger than b.

2. A composite material as claimed in claim 1 wherein the average particle diameter of the composite material is in the range of 40 to 400 nm.

3. A composite material as claimed in claim 1 wherein the polymer is one obtained by emulsion polymerization using a phosphate emulsifier.

4. A composite material as claimed in claim 1 wherein the polymer is one obtained by emulsion polymerization using a carboxylate emulsifier.

5. A composite material as claimed in claim 1 wherein the polymer has at least one group selected from the group consisting of alkoxysilyl and silanol groups.

6. A composite material as claimed in claim 5 wherein the polymer is one obtained by subjecting a mixture of an alkoxysilane compound having a mercapto group and a radical-polymerizable vinyl compound to emulsion polymerization in an aqueous system.

7. A composite material as claimed in claim 5 wherein the polymer is one obtained by subjecting a mixture of an alkoxysilane compound having an ethylenically unsaturated group and a radical-polymerizable vinyl compound to emulsion polymerization in an aqueous system.

8. A molded article containing the composite material of claim 1.

9. A molded article as claimed in claim 8 which has a substantial thickness.

10. A molded article as claimed in claim 8 wherein the colloidal silica is dispersed in the molded article while remaining substantially in the form of primary particles.

11. A method for producing molded articles which comprises the step of melt-forming the composite material of claim 1.

12. The molded article as claimed in claim 8, wherein said molded article is a resin molded article comprising thermoplastic resin and the composite material of claim 1.

13. The molded article as claimed in claim 12, wherein the colloidal silica is dispersed in the molded article while remaining substantially in the form of primary particles.

14. The composite material as claimed in claim 1, wherein said particle polymers have an average particle diameter of 30 to 300 nm.

* * * * *